US009751418B2

United States Patent
Nyu

(10) Patent No.: US 9,751,418 B2
(45) Date of Patent: Sep. 5, 2017

(54) CHARGE MANAGING SYSTEM, CHARGER, AND PROGRAM

(75) Inventor: Takayuki Nyu, Tokyo (JP)

(73) Assignee: NEC Corporation, Tokyo (JP)

( * ) Notice: Subject to any disclaimer, the term of this patent is extended or adjusted under 35 U.S.C. 154(b) by 374 days.

(21) Appl. No.: 14/238,411

(22) PCT Filed: Jul. 9, 2012

(86) PCT No.: PCT/JP2012/067493
§ 371 (c)(1),
(2), (4) Date: May 27, 2014

(87) PCT Pub. No.: WO2013/024645
PCT Pub. Date: Feb. 21, 2013

(65) Prior Publication Data
US 2014/0320080 A1  Oct. 30, 2014

(30) Foreign Application Priority Data

Aug. 12, 2011  (JP) .................................. 2011-177111

(51) Int. Cl.
*H02J 7/00* (2006.01)
*H02J 7/14* (2006.01)
(Continued)

(52) U.S. Cl.
CPC ......... *B60L 11/1824* (2013.01); *B60L 11/184* (2013.01); *B60L 11/185* (2013.01);
(Continued)

(58) Field of Classification Search
CPC ........................... B60L 11/1824; H02J 7/0004
(Continued)

(56) References Cited

U.S. PATENT DOCUMENTS 5,369,352 A * 11/1994 Toepfer ................. B60L 3/0069
320/110
5,952,813 A * 9/1999 Ochiai ................... H02J 7/0011
320/104
(Continued)

FOREIGN PATENT DOCUMENTS

CA 2122113 A1 10/1994
DE 69420449 T2 4/1994
(Continued)

OTHER PUBLICATIONS

International Search Report corresponding to PCT/JP2012/067493, dated Oct. 2, 2012 (5 pages).
(Continued)

*Primary Examiner* — Alexis Pacheco
(74) *Attorney, Agent, or Firm* — Wilmer Cutler Pickering Hale and Dorr LLP

(57) ABSTRACT

A charge managing system includes a power receiving device 102 for receiving, from a commercial power supply 1, power to be used for charge, a storage battery 104 for accumulating power to be used for charge, a rapid charger 105 for performing charge to an electric vehicle, and a charge managing server 106 for controlling the rapid charger 105 and calculating a charge capacity of the rapid charger 105. The charge managing server 106 includes a communicating unit 1061 for acquiring information on power that can be used for charge from the power receiving device 102 and the storage battery 104, and rated output information on the rapid charger 105, and a charge-capacity calculating unit 1062 for calculating a charge capacity of the rapid charger 105, based on power that can be used for charge from the power receiving device 102 and the storage battery 104, and rated output power of the rapid charger 105.

12 Claims, 10 Drawing Sheets

(51) Int. Cl.
*B60L 11/18* (2006.01)
*H01M 10/46* (2006.01)

(52) U.S. Cl.
CPC ......... *B60L 11/1848* (2013.01); *H01M 10/46* (2013.01); *H02J 7/0004* (2013.01); *H02J 7/0027* (2013.01); *B60L 2230/16* (2013.01); *B60L 2230/40* (2013.01); *B60L 2240/70* (2013.01); *B60L 2240/80* (2013.01); *Y02T 10/7005* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 30/12* (2013.01); *Y04S 30/14* (2013.01)

(58) Field of Classification Search
USPC ....... 320/104, 109, 103, 107, 130, 132, 108, 320/111, 116, 122, 125, 138, 160
See application file for complete search history.

(56) References Cited

U.S. PATENT DOCUMENTS

2008/0084179 A1* 4/2008 Emori .................. H02J 7/0016
 320/109
2011/0127958 A1* 6/2011 Ishishita ............. B60L 11/1862
 320/109

FOREIGN PATENT DOCUMENTS

| EP | 622265 A3 | 4/1995 |
|---|---|---|
| JP | H05-207668 A | 8/1993 |
| JP | H07-007860 A | 1/1995 |
| JP | H10-290533 A | 10/1998 |
| JP | 2004-229355 A | 8/2004 |
| JP | 2007-336778 A | 12/2007 |
| JP | 2010-110173 A | 5/2010 |
| JP | 2010-252587 A | 11/2010 |
| JP | 2011-097825 A | 5/2011 |
| JP | 2011-200104 A | 10/2011 |
| JP | 2012-034488 A | 2/2012 |
| JP | 2012-039864 A | 2/2012 |
| JP | 2012-152035 A | 8/2012 |
| JP | 2012-175823 A | 9/2012 |
| WO | WO-2011/083873 A1 | 7/2011 |

OTHER PUBLICATIONS

Japanese Office Action issued in corresponding Japanese Patent Application No. 2013-528932, dated Dec. 5, 2016, 11 pages.

* cited by examiner

Fig. 3

| | NAME | NAKAHARA CHARGE STATION |
|---|---|---|
| | ADDRESS | NAKAHARA-KU, KAWASAKI-SHI, KANAGAWA |
| | POSITION | N35.57, E139.66 |
| CHARGE STATION | OPERATING TIME | 24 HOURS |
| | REGULAR HOLIDAY | NIL |
| | RECEIVABLE POWER | 20kW |
| | NUMBER OF RAPID CHARGERS | 1 |
| | KIND | RAPID CHARGER |
| RAPID CHARGER | RATED POWER | 50kW |
| | STATUS | BEING USED |
| POWER | RATED POWER | 20kW |
| RECEIVING DEVICE | STATUS | RECEIVING 20 kW |
| CHARGE AND | RATED POWER | 50kW |
| DISCHARGE DEVICE | STATUS | DISCHARGING 30 kW |
| | MAXIMUM STORAGE-BATTERY CAPACITY | 20kWh |
| | RATED CHARGE POWER | 20kW |
| STORAGE BATTERY | RATED DISCHARGE POWER | 30kW |
| | CHARGE RATE | 60% |
| | STATUS | DISCHARGING 30 kW |

Fig. 5

| TIME | RECEIVABLE POWER | STORAGE BATTERY DISCHARGE POWER | X | ACQUIRED CHARGE REMAINING TIME | CHARGE REMAINING TIME | EV CHARGE RATE | STORAGE BATTERY CHARGE RATE | CHARGE CAPACITY | RAPID CHARGER STATUS |
|---|---|---|---|---|---|---|---|---|---|
| 1 | 20 | 30 | x | null | null | null | 20 | 50 | UNUSED |
| 2 | 20 | 30 | 3 | null | null | null | 20 | 50 | UNUSED |
| 3 | 20 | 30 | 3 | 30 | 30 | 10 | 18 | 50 | BEING USED |
| 4 | 20 | 30 | 3 | 29 | 29 | 13 | 15 | 50 | BEING USED |
| 5 | 20 | 30 | 3 | 28 | 28 | 17 | 10 | 50 | BEING USED |
| 6 | 20 | 30 | 3 | 27 | 27 | 20 | 7 | 50 | BEING USED |
| 7 | 20 | 30 | 3 | 26 | 26 | 24 | 4 | 50 | BEING USED |
| 8 | 20 | 30 | 3 | 25 | 25 | 30 | 2 | 50 | BEING USED |
| 9 | 20 | 30 | 3 | null | 23 | 34 | 1 | 20 | BEING USED |
| 10 | 20 | 30 | 3 | null | 21 | 40 | 0 | 20 | BEING USED |
| 11 | 20 | 30 | 3 | null | 19 | 45 | 0 | 20 | BEING USED |
| 12 | 20 | 30 | 3 | null | 17 | 50 | 0 | 20 | BEING USED |
| 13 | 20 | 30 | 3 | null | 16 | 55 | 0 | 20 | BEING USED |
| 14 | 20 | 30 | 3 | null | 14 | 60 | 0 | 20 | BEING USED |
| 15 | 20 | 30 | 3 | null | 10 | 70 | 0 | 20 | BEING USED |
| 16 | 20 | 30 | 3 | null | 7 | 80 | 0 | 20 | BEING USED |
| 17 | 20 | 30 | 3 | null | 3 | 90 | 0 | 20 | BEING USED |
| 18 | 20 | 30 | 3 | null | 0 | 100 | 0 | 20 | BEING USED |
| 19 | 20 | 30 | 3 | null | null | null | 1 | 20 | UNUSED |
| 20 | 20 | 30 | 3 | null | null | null | 2 | 20 | UNUSED |

Fig. 10

| TIME | RECEIVABLE POWER | STORAGE BATTERY DISCHARGE POWER | RATED OUTPUT [1] | RATED OUTPUT [2] | RATED OUTPUT [3] | RAPID CHARGER STATUS [1] | RAPID CHARGER STATUS [2] | RAPID CHARGER STATUS [3] | CHARGE POWER [1] | CHARGE POWER [2] | CHARGE POWER [3] | CHARGE POWER [1] | CHARGE POWER [2] | CHARGE POWER [3] |
|---|---|---|---|---|---|---|---|---|---|---|---|---|---|---|
| 1 | 20 | 30 | 50 | 50 | 50 | UNUSED | UNUSED | UNUSED | 0 | 0 | 0 | 50 | 50 | 50 |
| 2 | 20 | 30 | 50 | 50 | 50 | UNUSED | BEING USED | UNUSED | 0 | 40 | 0 | 10 | 50 | 20 |
| 3 | 20 | 30 | 50 | 50 | 50 | UNUSED | BEING USED | UNUSED | 0 | 30 | 0 | 20 | 50 | 10 |
| 4 | 20 | 30 | 50 | 50 | 50 | BEING USED | BEING USED | UNUSED | 20 | 20 | 0 | 30 | 50 | 20 |
| 5 | 20 | 30 | 50 | 50 | 50 | BEING USED | BEING USED | UNUSED | 15 | 15 | 0 | 35 | 50 | 30 |
| 6 | 20 | 30 | 50 | 50 | 50 | BEING USED | BEING USED | BEING USED | 10 | 10 | 20 | 40 | 50 | 40 |
| 7 | 20 | 30 | 50 | 50 | 50 | BEING USED | BEING USED | BEING USED | 5 | 5 | 30 | 45 | 50 | 50 |
| 8 | 20 | 30 | 50 | 50 | 50 | UNUSED | UNUSED | BEING USED | 0 | 0 | 40 | 10 | 10 | 50 |
| 9 | 20 | 30 | 50 | 50 | 50 | UNUSED | UNUSED | BEING USED | 0 | 0 | 30 | 20 | 20 | 50 |
| 10 | 20 | 30 | 50 | 50 | 50 | UNUSED | UNUSED | BEING USED | 0 | 0 | 20 | 30 | 30 | 50 |
| 11 | 20 | 30 | 50 | 50 | 50 | UNUSED | UNUSED | BEING USED | 0 | 0 | 10 | 40 | 40 | 50 |
| 12 | 20 | 30 | 50 | 50 | 50 | UNUSED | UNUSED | BEING USED | 0 | 0 | 5 | 45 | 45 | 50 |
| 13 | 20 | 30 | 50 | 50 | 50 | UNUSED | UNUSED | UNUSED | 0 | 0 | 0 | 50 | 50 | 50 |

CHARGE MANAGING SYSTEM, CHARGER, AND PROGRAM

BACKGROUND

The present invention relates to a charge managing system, a charger, and a program.

There have been considered charge systems that realize a business model of providing a charge service to owners of electric vehicles and acquiring counter values for the service from the owners of the electric vehicles, based on installation of a charger that can charge batteries mounted on electric vehicles. Time required for charging a storage battery in an electric vehicle varies depending on specifications of an electric vehicle and specifications of a charger. According to a method generally referred to as rapid charge, several tens of minutes are necessary, and according to a method referred to as ordinary charge, several hours are necessary. Thus, a longer time is necessary than a time (about a few minutes) required for filling gasoline to a gasoline vehicle. Therefore, it is considered difficult for the owner of an electric vehicle to take such an easy behavior as entering a service station without reservation and fill gasoline by waiting until a previous visitor finishes filling the visitor's vehicle, just like filling gasoline to a gasoline vehicle.

As one of systems for supporting users who receive a charge service to the electric vehicles, a full-occupancy information providing system that provides the users with information about whether the charger is being used can be considered. This system is for supporting the users to take behavior of confirming an availability situation of a charger based on a car navigation terminal, a portable telephone, or a display panel of a charger-installation place, searching an available charger, and charging. Such a system provides the users with a using-situation of a charger such as an operating time, number of chargers, maximum power (50 kW, 15 A/200 V, etc.) that a charger can provide. The number of chargers and maximum power and the like are in most cases the information registered in advance in a database as static information. Further, such a system also provides users who started charge with information about a scheduled charge-end time, a charge amount, and charge completion, and supports the users in taking behavior of coming back to their vehicles.

On the other hand, there have been considered charge systems that are built in with a storage battery to reduce operation cost of a charge system and to use reproducible energy for charge. For example, in Patent Document 1, there is disclosed a charge station that includes a plurality of chargers, a plurality of batteries, a power generator using a new energy such as photovoltaic power generation, and a power receiving unit for receiving a commercial power supply. The charge station described in Patent Document 1 accumulates night power that is at lower cost than that of daytime power and reproducible energy into a storage battery, and charges an electric vehicle by using the accumulated power and power from the commercial power supply.

Patent Document 1: Patent Publication JP-A-2010-252587

However, in the case of the charge system built in with a storage battery as described in Patent Document 1, a power situation to be used for charging the electric vehicle changes depending on an amount of power accumulated in the storage battery. For example, when an amount of power accumulated in the storage battery is zero, even when a capacity of an installed rapid charger is maximum 50 kW, when power that can be acquired from a commercial power supply is 20 kW, a charge service of only 20 kW can be provided. Further, for example, when an amount of power accumulated in second and subsequent batteries is 2 kWh, even when three rapid chargers are installed, there is a possibility that a power amount is in shortage to charge an electric vehicle, and there is a case that the service can be provided by only one rapid charger.

Further, in the course of performing charge to a plurality of electric vehicles, when charge to one vehicle has finished, the power so far being used becomes a surplus and can be used to charge other vehicles. In this case, regarding the charge to the other vehicles, the charge will finish earlier than a scheduled charge-end time that is assumed at a charge start time. That is, providing only static information has a problem in that the users cannot recognize a charge capacity and a scheduled charge-end time that change depending on a change in an amount of power accumulated in batteries and a change in a power situation due to a change in a situation of power charge to the other electric vehicles.

SUMMARY

An exemplary object of the present invention is to provide a charge managing system that can provide information by determining a charge capacity of a charger and a scheduled charge-end time, following a change in a power situation that can be used for charge.

A charge managing system according to the present invention is for performing charge to an electric vehicle, and includes: a power receiving device for receiving, from an external device, power to be used for charge; a storage battery for accumulating power to be used for charge; a charger for performing charge to the electric vehicle; and a charge managing server for controlling the charger and calculating a charge capacity of the charger. The charge managing server includes: a communicating unit for acquiring information on power that can be used for charge from the power receiving device and the storage battery, and rated output information on the charger, and a charge-capacity calculating unit for calculating a charge capacity of the charger, based on power that can be used for charge from the power receiving device and the storage battery, and the rated output power of the charger.

According to an exemplary aspect of the present invention, it is possible to provide information by determining a charge capacity of a charger and a scheduled charge-end time, following a change in a power situation that can be used for charge.

DESCRIPTION OF DRAWINGS

FIG. 3 is a drawing showing an example of information accumulated in a database according to the first embodiment of the present invention.

FIG. 5 is a drawing for specifically explaining the operation of the charge managing server according to the first embodiment of the present invention.

FIG. 10 is a drawing for specifically explaining the operation of the charge managing server according to the third embodiment of the present invention.

EXEMPLARY EMBODIMENT

First Embodiment

Next, embodiments for implementing the present invention are described in detail with reference to the drawings.

Figure 1:
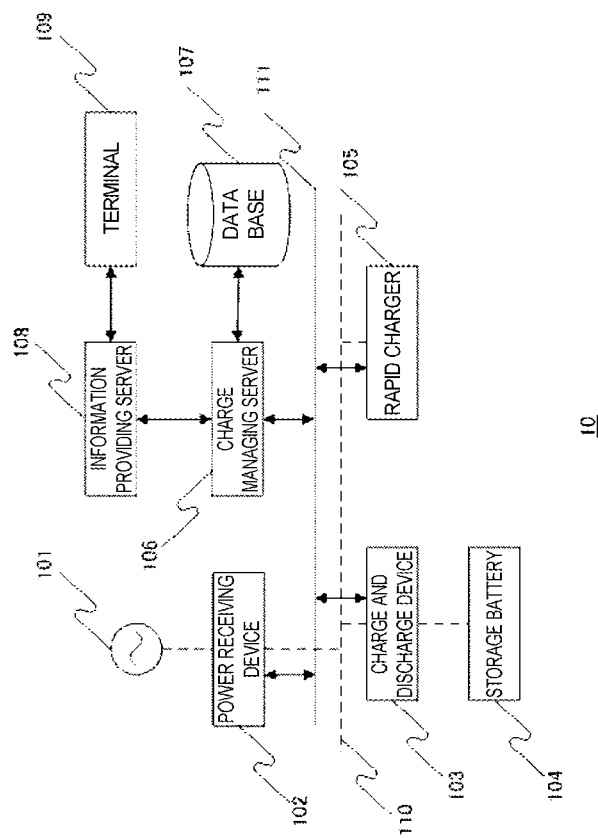
FIG. 1 is a block diagram showing a configuration of a charge managing system according to a first embodiment of the present invention.

FIG. 1 is a block diagram showing a configuration of a charge managing system 10 according to a first embodiment of the present invention. As shown in the drawing, the charge managing system 10 includes a commercial power supply 101, a power receiving device 102 that receives power from the commercial power supply, a charge and discharge device 103 that performs charge and discharge to and from a storage battery, a storage battery 104, a rapid charger 105 that performs rapid charge to an electric vehicle, a charge managing serve 106 that manages the charge managing system 10, a database 107 that stores information on the charge managing system 10, an information providing server 108 that presents information related to the charge managing system 10 to a user, a terminal 109 of the user, a power line 110 for supplying and receiving power between devices, and a network 111 for supplying and receiving control information between devices.

Figure 2:
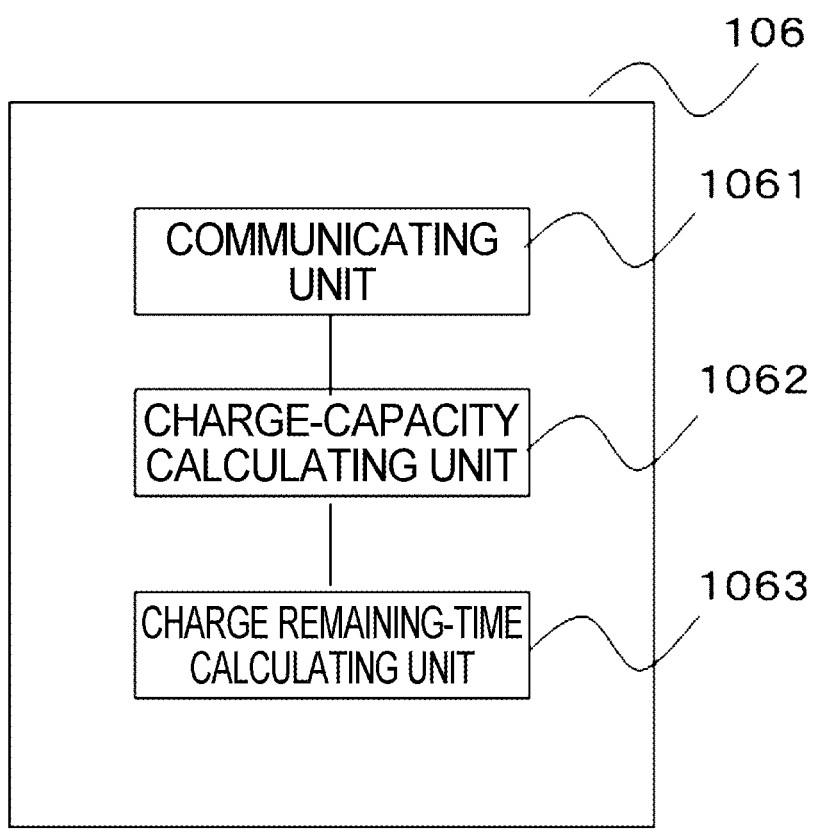
FIG. 2 is a block diagram showing a functional configuration of a charge managing server according to the first embodiment of the present invention.

FIG. 2 is a block diagram showing a functional configuration of the charge managing server 106.

As shown in the drawing, the charge managing server 106 includes a communicating unit 1061, a charge-capacity calculating unit 1062, and a charge remaining-time calculating unit 1063. The communicating unit 1061 has a function of transmitting and receiving information to and from other devices of the charge managing system 10. The charge-capacity calculating unit 1062 and the charge remaining-time calculating unit 1063 have respective functions of calculating a charge capacity and a charge remaining time of the rapid charger 105.

For the charge managing server 106, there can be applied an exclusive or general-purpose computer including memories such as a CPU, a ROM, and a RAM, an external storage device that stores various information, an input interface, an output interface, a communication interface, and a bus that connects between these interfaces. The charge managing server 106 may be configured by a single computer, or may be configured by a plurality of computers connected to each other via a communication line.

The communicating unit 1061, the charge-capacity calculating unit 1062, and the charge remaining-time calculating unit 1063 correspond to modules of functions that are realized by the CPU executing predetermined programs accumulated in the ROM and the like.

Next, an operation of the charge managing system 10 is explained.

FIG. 3 is a drawing showing an example of information accumulated in the database 107. As the information relevant to a charge station as a whole that includes the charge managing system 10, an address, an operating time, receivable power, number of the rapid chargers 105 and the like are stored. Further, rated power, status information and the like of each of the rapid charger 105, the power receiving device 102, the charge and discharge device 103, and the storage battery 104 are stored.

Figure 4:
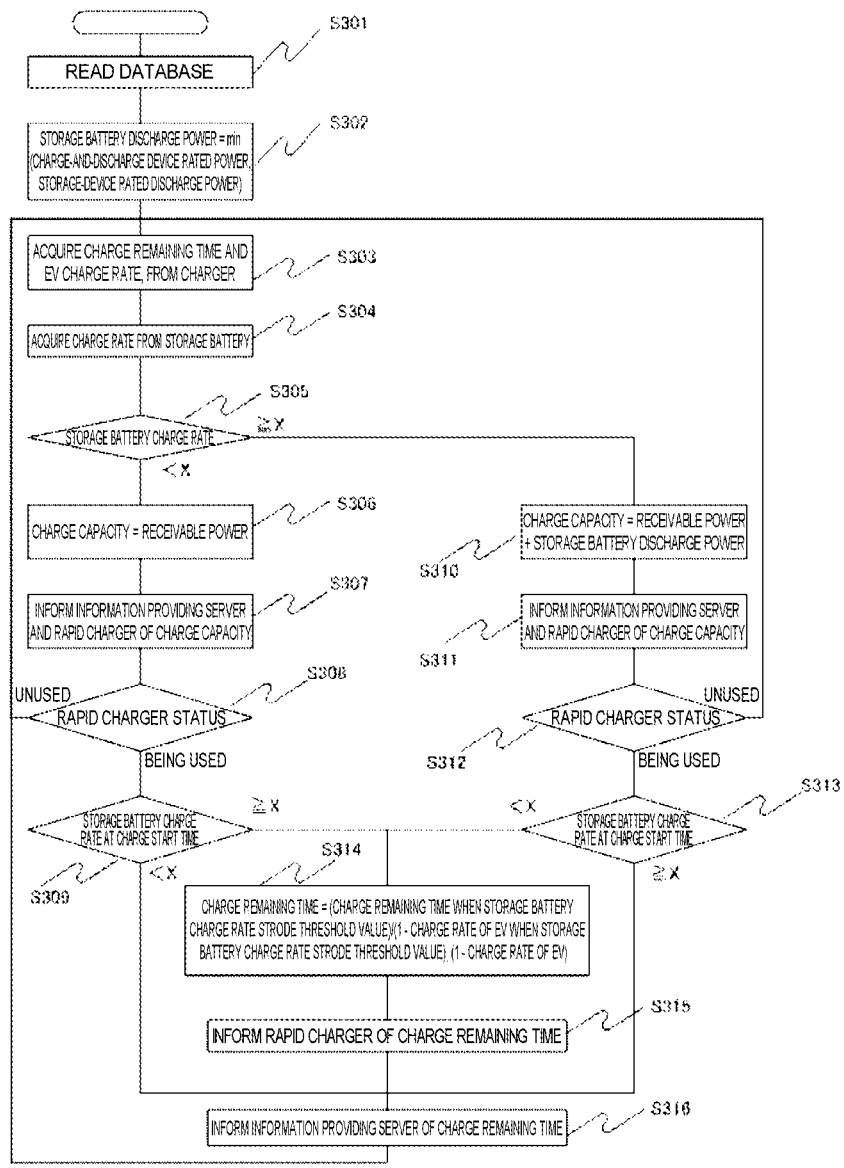
FIG. 4 is a flowchart showing an operation of the charge managing server according to the first embodiment of the present invention.

FIG. 4 is a flowchart showing an operation of the charge managing server 106. FIG. 5 is a drawing showing changes of various information when charge to an electric vehicle is performed.

After the charge managing server 106 is started, the charge managing server 106 reads information related to the database 107 (step S301). Next, the charge managing server 106 sets discharge power from the storage battery 104 to rated power of the charge and discharge device 103 or rated discharge power of the storage battery 104, whichever is a smaller value (step S302).

Next, the charge managing server 106 acquires a charge remaining time and an EV (electric vehicle) charge rate from the rapid charger 105 (step S303). However, both the charge remaining time and the EV charge rate become null when charge to an electric vehicle is not being performed. Further, the charge managing server 106 acquires a charge rate from the storage battery 104 (step S304). Next, the charge managing server 106 compares the charge rate of the storage battery 104 with a threshold value X that is set in advance (step S305).

When a storage battery charge rate is X or higher, the charge managing server 106 sets a charge capacity to a sum of receivable power (power from the commercial power supply) and storage battery discharge power (power from the storage battery 104), or rated output of the rapid charger 105, whichever is a smaller value (step S310). The charge managing server 106 informs both the information providing server 108 and the rapid charger 105 of a calculated charge capacity (step S311).

Next, the charge managing server 106 decides a status of the rapid charger 105 (step S312), and returns to step S303 when the rapid charger 105 is unused. When the rapid charger 105 is being used, the charge managing server 106 decides whether a storage battery charge rate at a charge start time is less than or at least equal to the threshold value X (step S313). When the storage battery charge rate at the charge start time is at least equal to the threshold value, the charge managing server 106 informs the information providing server 108 of the charge remaining time acquired from the rapid charger 105 (step S316). On the other hand, when the storage battery charge rate at the charge start time is less than the threshold value X, because a charge capacity has been changed during a period from the charge start time to the present time, the charge managing server 106 calculates a charge remaining time by using the EV charge rate (step S314).

Next, the charge managing server 106 informs the rapid charger 105 of a calculated charge remaining time (step S315), and also informs the information providing server 108 of the calculated charge remaining time (step S316).

When the storage battery charge rate is less than X in step S305, a charge capacity is set at the receivable power (power from the commercial power supply) or the rated output of the rapid charger 105, whichever is a smaller value (step S306). The charge capacity is informed to both the information providing server 108 and the rapid charger 105 (step S307).

Next, the charge managing server 106 decides a status of the rapid charger 105 (step S308), and returns to a process of S303 when the rapid charger 105 is unused. When the rapid charger 105 is being used, the charge managing server 106 decides whether a storage battery charge rate at the charge start time is less than or at least equal to the threshold value X (step S309). When the storage battery charge rate at the charge start time is less than the threshold value, the charge managing server 106 informs the information providing server 108 of the charge remaining time acquired from the rapid charger 105 (step S316). On the other hand, when the storage battery charge rate at the charge start time is at least equal to the threshold value X, because a charge capacity has been changed during a period from the charge start time to the present time, the charge managing server 106 calculates a charge remaining time by using the EV charge rate (step S314).

A charge remaining time can be calculated by using the following formula.

Charge remaining time=(charge remaining time when storage battery charge rate strode threshold value $X$)/(1−EV charge rate when storage battery charge rate strode threshold value $X$)* (1−EV charge rate at present)

The charge managing server 106 informs the rapid charger 105 of a calculated charge remaining time (step S315), and also informs the information providing server 108 of the calculated charge remaining time (step S316).

The operation of the charge managing system 10 is specifically described with reference to FIG. 5. In FIG. 5, it is assumed that the threshold value X is 3% and a storage battery charge rate is 20%. At time 1, because the storage battery charge rate is the threshold value X or higher, a charge capacity becomes 50 kW which is a sum of receivable power 20 kW and storage battery discharge power 30 kW.

At time 3, although a rapid charger status is that the rapid charger is being used, because a storage battery charge rate is 3% or higher, a charge remaining time is 30 minutes that is directly employed from a value acquired from the rapid charger 105.

At time 8, a storage battery charge rate becomes 2%, and because the storage battery charge rate becomes less than the threshold value X, receivable power 20 kW is set as a charge capacity. Further, because a storage battery charge rate that is the threshold value or higher at the charge start time becomes less than the threshold value X, a charge capacity is changed. Therefore, a charge remaining time is calculated by using an EV charge rate.

At time 9, a charge remaining time is 23 minutes, and at time 10, a charge remaining time becomes 21 minutes. Further, at time 18, at an EV charge rate 100%, a charge remaining time becomes zero. At time 19 and 20, a rapid charger status becomes that the rapid charger is unused, and charge to the storage battery 104 is performed. Although a storage battery charge rate increases, because the storage battery charge rate is the threshold value or lower, a charge capacity remains at 20 kW.

During the above changes of statuses, by using the terminal 109, the user can confirm from the information related to the charge station that, at time 1, the rapid charger 105 of a charge capacity 50 kW is unused. At time 6, the user can confirm that the rapid charger 105 of the charge capacity 50 kW is being used. At time 12, the user can confirm that the rapid charger 105 of a charge capacity 20 kW is being used, and at time 19, the user can confirm that the rapid charger 105 of the charge capacity 20 kW is unused.

In the present embodiment, although the charge managing system 10 includes a set of the storage battery 104 and the charge and discharge device 103, the charge managing system 10 can also include two or more sets of the storage battery 104 and the charge and discharge device 103. Further, although the storage battery 104 is used for a power providing device that is used for charge, other power generation facilities such as a solar cell and a wind power generator can be also used.

In the present embodiment, a method of calculating a charge capacity is changed depending on whether a storage battery charge rate is at least equal to or less than the threshold value X. However, values that are different for vehicle types of electric vehicles may be used for threshold values. Because capacities of mounted batteries are different depending on vehicle types, a proper charge capacity can be calculated by using threshold values that are different for vehicle types.

As described above, according to the present embodiment, a power using state in the charge managing system 10 is acquired, a charge capacity to be allocated to the rapid charger 105 is calculated based on the acquired power information, and the calculated information is informed to the information providing server 108. Therefore, the user of the charge service can acquire not only static information on rated output of the rapid charger 105 but also a charge capacity and a charge remaining time that dynamically change following changes in an accumulated amount of power or power receivable power of the storage battery 104 and usage conditions of the rapid charger 105.

Second Embodiment

The configuration of the first embodiment is that, out of power contributing to charge to an electric vehicle, the amount of power accumulated in the storage battery changes. In a second embodiment, power received from a commercial power supply changes.

Figure 6:
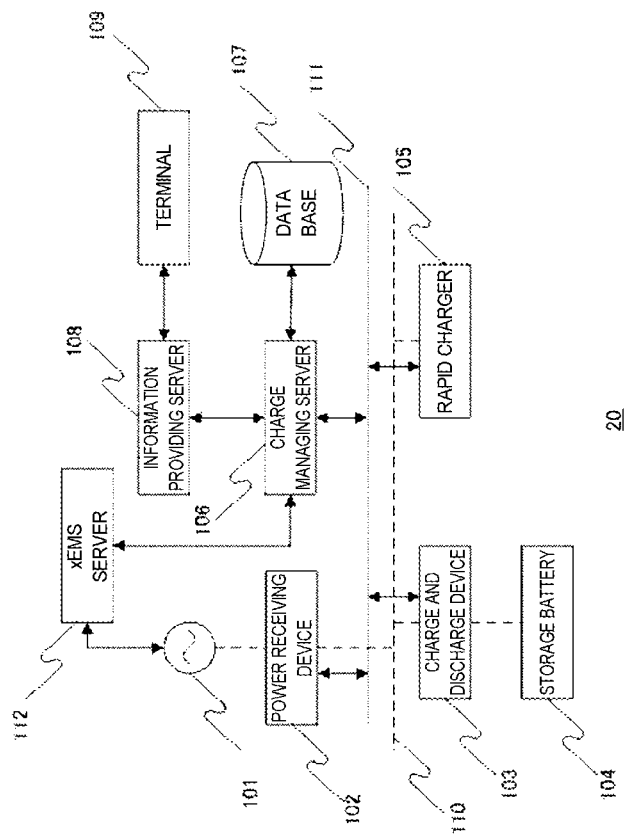
FIG. 6 is a block diagram showing a configuration of a charge managing system according to a second embodiment of the present invention.

FIG. 6 is a block diagram showing a configuration of a charge managing system 20 according to the second embodiment of the present invention. Reference numerals that are identical with those in FIG. 1 denote similar configuration elements. As shown in the drawing, the charge managing system 20 includes an xEMS server 112, in addition to the configuration of the charge managing system 10 in the first embodiment. The xEMS server 112 monitors a using state of the commercial power supply 101, and informs the charge managing server 106 of power information that can be received from the commercial power supply 101.

Figure 7:
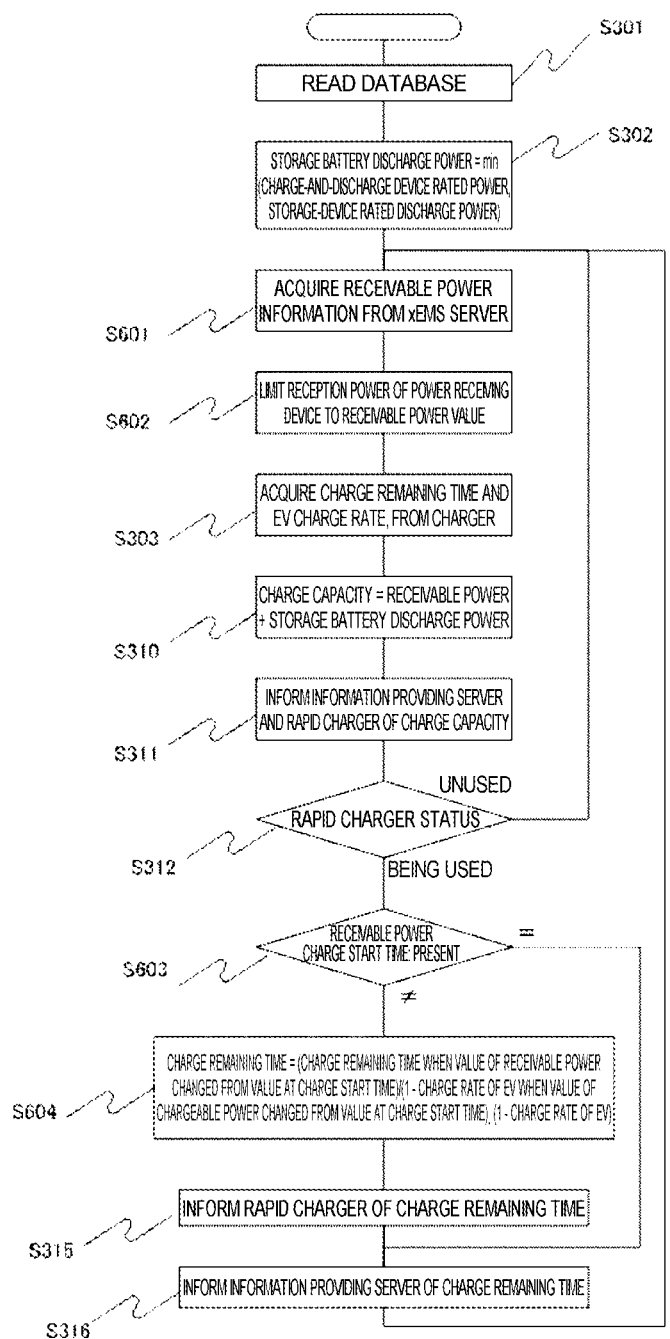
FIG. 7 is a flowchart showing an operation of the charge managing server according to the second embodiment of the present invention.

FIG. 7 is a flowchart showing an operation of the charge managing server 106 according to the second embodiment. In this case, it is assumed that a charge rate of the storage battery 104 is constant.

First, after the charge managing server 106 is started, the charge managing server 106 reads information related to the database 107 (step S301). Next, the charge managing server 106 sets discharge power from the storage battery 104 to rated power of the charge and discharge device 103 or rated discharge power of the storage battery 104, whichever is a smaller value (step S302).

Next, the charge managing server 106 acquires information related to power receivable from the commercial power supply 101, from the xEMS server 112 (step S601). Next, the charge managing server 106 sets a value of the acquired receivable power to a reception-power upper limit value of the power receiving device 102 (step S602). Next, the charge managing server 106 acquires a charge remaining time and an EV (electric vehicle) charge rate from the rapid charger 105 (step S303).

Further, the charge managing server 106 calculates a charge capacity as a sum of receivable power (power from the commercial power supply) and storage battery discharge power (power from the storage battery 104) (step S310). The charge managing server 106 informs both the information providing server 108 and the rapid charger 105 of a calculated charge capacity (step S311). Further, the charge managing server 106 decides a status of the rapid charger 105 (step S312), and returns to step S601 and repeats the above operation when the rapid charger 105 is unused.

After charge to the electric vehicle is started, and when a status of the rapid charger 105 is changed while the rapid charger 105 is being used (step S312; being used), the charge managing server 106 compares chargeable power at the charge start time with chargeable power at present (step S603). When there is no change (equal), the charge managing server 106 informs the information providing server 108 of a charge remaining time acquired from the charger 105 (step S316). On the other hand, when there is a change (not coincide), the charge managing server 106 calculates a charge remaining time from the charge remaining time at the charge start time and the EV charge rate (step S604), and informs both the rapid charger 105 and the information providing server 108 of a calculated charge remaining time (steps S315 and S316).

A charge remaining time can be calculated by using the following formula.

Charge remaining time=(charge remaining time when receivable power changed from value at charge start time)/(1−EV charge rate when receivable power changed from value at charge start time)*(1−EV charge rate at present)

During the above changes of statuses, when the user confirms information related to the charge station by using the terminal 109, the user can recognize, in a similar manner to that in the first embodiment, a charge capacity and a charge remaining time of the rapid charger 105 that reflect a change in the receivable power from the commercial power supply 101.

Third Embodiment

Figure 8:
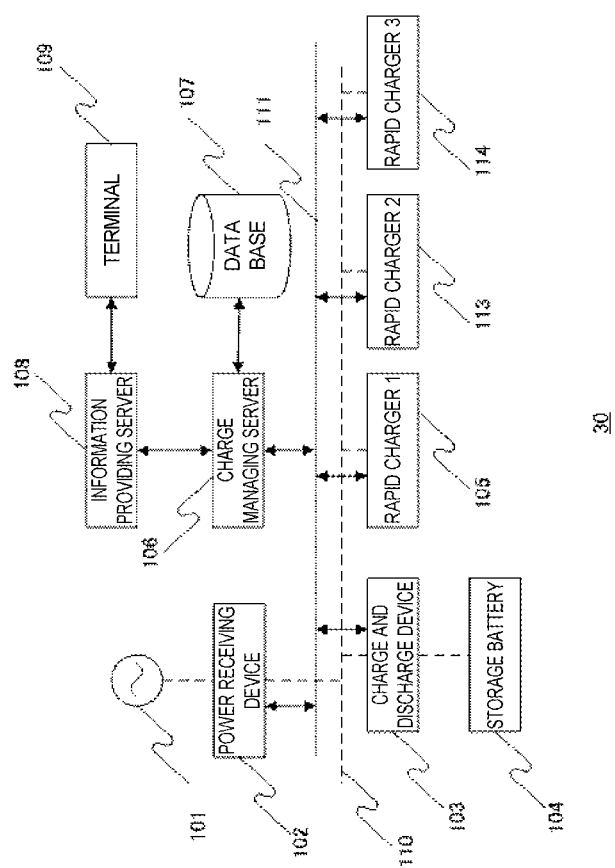
FIG. 8 is a block diagram showing a configuration of a charge managing system according to a third embodiment of the present invention.

FIG. 8 is a block diagram showing a configuration of a charge managing system 30 according to a third embodiment of the present invention. Reference numerals that are identical with those in FIG. 1 denote similar configuration elements. As shown in the drawing, the third embodiment is different from the first embodiment in that the charge managing system 30 includes a plurality of rapid chargers 105, 113, and 114.

Figure 9:
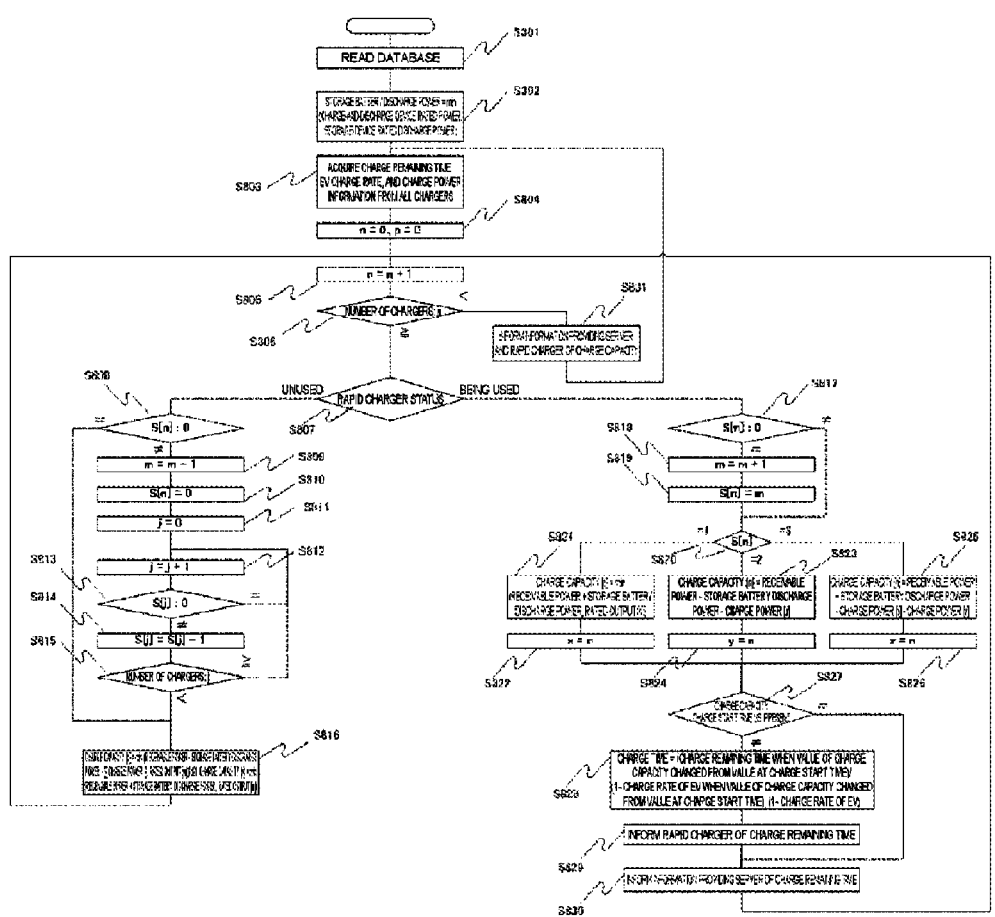
FIG. 9 is a flowchart showing an operation of the charge managing server according to the third embodiment of the present invention.

FIG. 9 is a flowchart showing an operation of the charge managing server 106 according to the third embodiment, and FIG. 10 is a drawing showing changes in various information when charge to an electric vehicle is performed. In this case, it is assumed that a charge rate of the storage battery 104 is constant.

First, after the charge managing server 106 is started, the charge managing server 106 reads information related to the database 107 (step S301). Next, the charge managing server 106 sets discharge power from the storage battery 104 to rated power of the charge and discharge device 103 or rated discharge power of the storage battery 104, whichever is a smaller value (step S302).

Next, the charge managing server 106 acquires information related to a charge remaining time, an EV charge rate, and charge power from each of all rapid chargers 105, 113, and 114 (step S803). Next, the charge managing server 106 performs a process of calculating a charge capacity and a charge remaining time according to a situation of a rapid charger status, for each rapid charger (steps S804 to S828). Further, the charge managing server 106 informs the rapid chargers and the information providing server 108 of a calculated charge remaining time (steps S829 to S831).

Regarding a charge capacity, when a status of a rapid charger is that the rapid charger is unused (step S807; unused), for the charge capacity of the rapid charger, the charge managing server 106 sets a value obtained by subtracting a total sum of charge power values of other rapid chargers from a sum of receivable power and batter discharge power, or rated output of the rapid charger, whichever is a smaller value (step S816).

When a status of a rapid charger is that the rapid charger is being used (step S807; being used), an allocated charge capacity is different depending on an order in which the rapid charger is started to be used. For a charge capacity of a rapid charger which is first started to be used among rapid chargers that are being used, a value obtained by adding receivable power and storage battery discharge power or rated output of the rapid charger, whichever is a smaller value, is set (step S821).

For a charge capacity of a rapid charger which is second started to be used, a value obtained by subtracting charge power of a rapid charger which is first started to be used from a sum of chargeable power and storage battery discharge power is set (step S823).

For a charge capacity of a rapid charger which is third started to be used, a value obtained by subtracting charge power of a rapid charger which is first started to be used and charge power of a rapid charger which is second started to be used from a sum of chargeable power and storage battery discharge power is set (step S825).

A charge remaining time is calculated from a charge remaining time when a charge capacity changed from a value at a charge start time and an EV charge rate (step S828), and is informed to the rapid charger (step S829).

A charge remaining time can be calculated by using the following formula.

Charge remaining time=(charge remaining time when charge capacity changed from value at charge start time)/(1−EV charge rate when charge capacity changed from value at charge start time)*(1−EV charge rate at present)

FIG. 10 shows a situation that the rapid chargers are started to be used in an order of 2 (113), 1 (105), and 3 (114). At time 1, none of the rapid chargers are used, and all charge capacities are set to 50 kW. At time 2, the rapid charger 2 starts being used, and a charge capacity at this time is 40 kW. From this fact, for charge capacities of the rapid chargers 1 and 3, 10 kW that is obtained by subtracting a total sum of charge power from a sum of receivable power and storage battery discharge power is set. At time 3, because the charge power of the rapid charger 2 is reduced to 30 kW, the charge capacities of the rapid chargers 1 and 3 change to 20 kW.

At time 4, the rapid charger 1 starts being used, and a charge power is 20 kW. Therefore, for a charge capacity of the rapid charger 1, 20 kW that is obtained by subtracting the charge power of the rapid charger 2 from a sum of receivable power and storage battery discharge power is set. For a charge capacity of the rapid charger 3, 10 kW that is obtained by subtracting a total sum of charge power from a sum of receivable power and storage battery discharge power is set. At time 6, the rapid charger 3 starts being used, and a charge power is 20 kW. At this time, 40 kW, 50 kW, and 30 kW are set respectively for charge capacities of the rapid chargers 1, 2, and 3. Thereafter, a similar operation is repeated, and all the rapid chargers become unused at time 13, and 50 kW is set for a charge capacity.

During the above changes of statuses, when the user confirms information related to the charge station by using the terminal 109, the user can recognize, in a similar manner to that in the first embodiment, a charge capacity and a charge remaining time that reflect a change in a using state of a rapid charger.

In the present embodiment, it is assumed that three rapid chargers can be always used. Alternatively, it may be arranged such that number of rapid chargers that can be used is determined by adding flags of usable and unusable depending on a size of a value of a charge capacity, and that number of rapid chargers that can be used is presented to the user via the information providing server 108. The operation flow in the present embodiment is an example, and a formula of calculating a charge capacity may be different according to a size relationship of a value of obtained information.

The present application claims priority based on Japanese Patent Application No. 2011-177111, filed on Aug. 12, 2011, and is incorporated herein by reference in its entirety.

While the invention of the present application is described with reference to the embodiments, the invention of the present application is not limited to the embodiments. In the configuration and the details of the invention of the present application, various modifications that a person skilled in the art concerned can understand can be made within a scope of the present invention.

A part or a whole of the above embodiments can be expressed as described in the following notes, but are not limited to the following notes.

(Note 1) A charge managing system for performing charge to an electric vehicle, including:
a power receiving device for receiving, from an external device, power to be used for charge;
a storage battery for accumulating power to be used for charge;
a charger for performing charge to the electric vehicle; and
a charge managing server for controlling the charger and calculating a charge capacity of the charger, wherein
the charge managing server includes:
a communicating unit for acquiring information on power that can be used for charge from the power receiving device and the storage battery, and rated output information on the charger, and
a charge-capacity calculating unit for calculating a charge capacity of the charger, based on power that can be used for charge from the power receiving device and the storage battery, and the rated output power of the charger.

(Note 2) The charge managing system according to note 1, wherein
the charge-capacity calculating unit
sets the smaller value of a sum of power, which can be used for charge from the power receiving device and the storage battery, and rated output power of the charger, to be a charge capacity of the charger, when a charge rate of the storage battery is at least a threshold value, and
sets the smaller of power that can be used for charge from the power receiving device and rated output power of the charger to be a charge capacity of the charger, when a charge rate of the storage battery is less than a threshold value.

(Note 3) The charge managing system according to note 1, further including a plurality of chargers, wherein
the charge-capacity calculating unit
sets a value, which is obtained by subtracting charge power that is being used by other chargers from a sum of power that can be used for charge from the power receiving device and the storage battery, to be a charge capacity of the charger.

(Note 4) The charge managing system according to note 1, wherein
the charge managing server includes a charge remaining-time calculating unit that calculates a charge remaining time of the electric vehicle charged by the charger, wherein
the charge remaining-time calculating unit
calculates a charge remaining time by a product of a charge remaining time at a time point when the charge capacity of the charger changed from the charge capacity at a charge start time, and an available capacity rate at present of the electric vehicle that is normalized by an available capacity rate (1−a charge rate) of the electric vehicle at the time point of the change.

(Note 5) The charge managing system according to note 4, wherein
the charge remaining-time calculating unit
sets a time point when a charge rate of the storage battery strode a threshold value as a time point when the charge capacity of the charger changed from the charge capacity at a charge start time.

(Note 6) The charge managing system according to note 4, wherein
the charge remaining-time calculating unit
sets a time point when power that can be used for charge from the power receiving device changed from power at a charge start time as a time point when the charge power of the charger changed from the charge power at a charge start time.

(Note 7) The charge managing system according to note 1, including an information providing server that presents information on a charge capacity of the charger calculated by the charge managing server.

(Note 8) A charger that performs charge to an electric vehicle, wherein
the charger receives a charge capacity of the charger calculated by a charge managing server that controls the charger and that calculates a charge capacity of the charger, and
the charge capacity is calculated based on power that can be used for charge from a power receiving device which receives power to be used for charge from an external device and from a storage battery that accumulates power to be used for charge, and also based on rated output power of the charger.

(Note 9) The charger according to note 8, wherein the charger receives a charge remaining time of the charger calculated by the charge managing server, from the charge managing server, and
the charge remaining time is calculated by a product of a charge remaining time at a time point when the charge capacity of the charger changed from the charge capacity at a charge start time, and an available capacity rate, at the current time, of the electric vehicle that is normalized by an available capacity rate (1−a charge rate) of the electric vehicle at the time point of the change.

(Note 10) A program that makes a computer function as a communicating unit that acquires information on power that can be used for charge from a power receiving device which receives power to be used for charge from an external device and from a storage battery that accumulates power to be used for charge, and rated output information on a charger that performs charge to an electric vehicle, and a charge-capacity calculating unit for calculating a charge capacity of the charger, based on power that can be used for charge from the power receiving device and the storage battery, and rated output power of the charger.

The present invention is suitable for providing information by determining a charge capacity and a scheduled charge-end time, following a change in a power situation that can be used for charge.

10, 20, 30 Charge managing system
101 Commercial power supply
102 Power receiving device
103 Charge and discharge device
104 Storage battery
105, 113, 114 Rapid charger
106 Charge managing server
107 Database
108 Information providing server
109 Terminal
110 Power line
111 Network
112 xEMS server
1061 Communicating unit
1062 Charge-capacity calculating unit
1063 Charge remaining-time calculating unit

I claim:

1. A charge managing system for performing charge to an electric vehicle, the system comprising:
a power receiving device for receiving, from an external device, power to be used for charge;
a storage battery for accumulating power to be used for charge to the electric vehicle;
a charger for performing charge to the electric vehicle; and
a charge managing server for controlling the charger and calculating a charge power of the charger to charge the electric vehicle, wherein
the charge managing server includes:
a communicating unit for acquiring information on power that can be used for charge from the power receiving device, power that can be used for charge from the storage battery, and rated output information on the charger, and
a charge-capacity calculating unit for calculating a charge power of the charger to charge the electric vehicle, based on power that can be used for charge from the power receiving device, power that can be used for charge from the storage battery, and the rated output power of the charger.

2. The charge managing system according to claim 1, wherein
the charge-capacity calculating unit
sets the smaller value of a sum of power, which can be used for charge from the power receiving device and the storage battery, and rated output power of the charger to be a charge power of the charger, when a charge rate of the storage battery is at least a threshold value, and
sets the smaller value of power that can be used for charge from the power receiving device and rated output power of the charger to be a charge power of the charger, when a charge rate of the storage battery is less than a threshold value.

3. The charge managing system according to claim 1, further comprising a plurality of chargers, wherein the charge-capacity calculating unit sets a value, which is obtained by subtracting charge power that is being used by other chargers from a sum of power that can be used for charge from the power receiving device and the storage battery, to be a charge power of the charger.

4. The charge managing system according to claim 1, wherein
the charge managing server comprises a charge remaining-time calculating unit that calculates a charge remaining time of the electric vehicle charged by the charger, wherein
the charge remaining-time calculating unit
calculates a charge remaining time by a product of a charge remaining time at a time point when the charge power of the charger changed from the charge power at a charge start time, and an available capacity rate at present of the electric vehicle that is normalized by an available capacity rate (1−a charge rate) of the electric vehicle at the time point of the change.

5. The charge managing system according to claim 4, wherein
the charge remaining-time calculating unit sets a time point when a charge rate of the storage battery strode a threshold value as a time point when the charge power of the charger changed from the charge power at a charge start time.

6. The charge managing system according to claim 4, wherein
the charge remaining-time calculating unit sets a time point when power that can be used for charge from the power receiving device changed from power at a charge start time as a time point when the charge power of the charger changed from the charge power at a charge start time.

7. The charge managing system according to claim 1, comprising an information providing server that presents information on a charge power of the charger calculated by the charge managing server.

8. A charger that performs charge to an electric vehicle, wherein
the charger receives a charge power of the charger calculated by a charge managing server that controls the charger and that calculates a charge power of the charger, and
the charge power is calculated based on power that can be used for charge from a power receiving device which receives power to be used for charge from an external device, power that can be used for charge from a storage battery that accumulates power to be used for charge, and rated output power of the charger.

9. The charger according to claim 8, wherein
the charger receives a charge remaining time of the charger calculated by the charge managing server, from the charge managing server, and
the charge remaining time is calculated by a product of a charge remaining time at a time point when the charge power of the charger changed from the charge power at a charge start time, and an available capacity rate, at the current time, of the electric vehicle that is normalized by an available capacity rate (1−a charge rate) of the electric vehicle at the time point of the change.

10. A non-transient tangible computer readable medium containing instruction which, when executed by a computer, allow the computer to perform the following instructions:
a communicating unit that acquires information on power that can be used for charge from a power receiving device which receives power to be used for charge from an external device, power that can be used for charge from a storage battery that accumulates power to be used for charge, and rated output information on a charger that performs charge to an electric vehicle, and a charge-capacity calculating unit for calculating a charge power of the charger, based on power that can be used for charge from the power receiving device, power that can be used for charge from the storage battery, and rated output power of the charger.

11. A charge managing system for performing charge to an electric vehicle, the system comprising:
   a power receiving device for receiving, from an external device, power to be used for charge to the electric vehicle;
   a plurality of chargers for performing charge to the electric vehicle; and
   a charge managing server for controlling the chargers, wherein
   the charge managing server includes:
   a charge-capacity calculating unit for setting a value, which is obtained by subtracting charge power that is being used by other chargers from the power that can be used for charge from the power receiving device, to be charge power of a charger to the electric vehicle.

12. A charger that performs charge to an electric vehicle, wherein
   the charger receives charge power of the charger calculated by a charge managing server that controls the charger and that calculates the charge power of the charger to the electric vehicle, and
   the charge power of the charger to the electric vehicle is a value which is obtained by subtracting charge power that is being used by other chargers from the power that can be used for charge from the power receiving device.

* * * * *